United States Patent
Minor et al.

(10) Patent No.: US 7,400,108 B2
(45) Date of Patent: Jul. 15, 2008

(54) SYSTEM AND METHOD FOR CONTROLLING MODULAR ROBOTS

(75) Inventors: Mark A. Minor, Salt Lake City, UT (US); Corey Schwensen, Edmonds, WA (US)

(73) Assignee: University of Utah Research Foundation, Salt Lake City, UT (US)

( * ) Notice: Subject to any disclaimer, the term of this patent is extended or adjusted under 35 U.S.C. 154(b) by 172 days.

(21) Appl. No.: 11/107,365

(22) Filed: Apr. 15, 2005

(65) Prior Publication Data

US 2006/0095169 A1    May 4, 2006

Related U.S. Application Data

(60) Provisional application No. 60/563,185, filed on Apr. 15, 2004.

(51) Int. Cl.
*B62D 59/00* (2006.01)
*B62D 53/02* (2006.01)
*B25J 5/00* (2006.01)

(52) U.S. Cl. .............. 318/568.12; 901/1; 280/408; 280/472; 180/14.1

(58) Field of Classification Search .......... 318/566, 318/567, 568.12; 901/1; 701/41, 1; 280/408, 280/409, 472, 456; 180/14.1–14.5
See application file for complete search history.

(56) References Cited

U.S. PATENT DOCUMENTS

| 3,235,020 | A |  | 2/1966 | Bekker |  |
|---|---|---|---|---|---|
| 3,550,710 | A |  | 12/1970 | Spanski |  |
| 5,559,696 | A |  | 9/1996 | Borenstein |  |
| 5,878,357 | A | * | 3/1999 | Sivashankar et al. | ........... 701/1 |
| 6,046,565 | A |  | 4/2000 | Thorne |  |
| 6,377,888 | B1 |  | 4/2002 | Olch |  |
| 6,484,083 | B1 |  | 11/2002 | Hayward et al. |  |
| 6,636,781 | B1 |  | 10/2003 | Shen et al. |  |
| 6,662,889 | B2 |  | 12/2003 | De Fazio et al. |  |
| 6,806,809 | B2 | * | 10/2004 | Lee et al. | ................. 340/431 |
| 6,836,702 | B1 |  | 12/2004 | Brogardh et al. |  |
| 6,853,877 | B1 |  | 2/2005 | Slater et al. |  |
| 2003/0212472 | A1 |  | 11/2003 | McKee |  |
| 2004/0130441 | A1 | * | 7/2004 | Lee et al. | ................. 340/431 |
| 2004/0162638 | A1 |  | 8/2004 | Solomon |  |
| 2004/0254677 | A1 |  | 12/2004 | Brogardh et al. |  |
| 2005/0055138 | A1 | * | 3/2005 | Lee et al. | ................. 701/1 |
| 2006/0247799 | A1 | * | 11/2006 | Takenaka et al. | ............. 700/54 |
| 2007/0005212 | A1 | * | 1/2007 | Xu et al. | ................. 701/70 |
| 2007/0055431 | A1 | * | 3/2007 | Deng et al. | ................. 701/71 |
| 2007/0088477 | A1 | * | 4/2007 | Brewer et al. | ................. 701/41 |

\* cited by examiner

OTHER PUBLICATIONS

Johann Borenstein, "Experimental Results from Internal Odometry Error Correction with the OmniMate Mobile Robot" IEEE Transactions on Robotics and Automation, Dec. 1998, 963-969, vol. 14, No. 6, Dec. 1998.

*Primary Examiner*—Lincoln Donovan
*Assistant Examiner*—Eduardo Colon
(74) *Attorney, Agent, or Firm*—Thorpe North & Western LLP

(57) ABSTRACT

Techniques are described for control of a robot system, wherein the robot system includes a plurality of individual wheeled robot modules interconnected by at least one compliant member. The technique includes developing a kinematic control model of the robot system from a combination of the kinematic characteristics of the individual wheeled robot modules and the stiffness properties of the compliant member. Development of the kinematic control model for a reconfigurable robot system is enhanced by the scalable nature of the technique.

14 Claims, 10 Drawing Sheets

SYSTEM AND METHOD FOR CONTROLLING MODULAR ROBOTS

This application claims the benefit of U.S. provision application Ser. No. 60/563,185, filed Apr. 15, 2004, entitled "System and Method for Controlling Modular Multi-Axle Robots," the disclosure of which is incorporated herein by reference in its entirety for all purposes.

FIELD OF THE INVENTION

The present invention relates generally to robotic control. More particularly, the present invention relates to control of compliant framed wheeled modular mobile robots.

BACKGROUND

Space exploration and the military require robots that are mobile, maneuverable, and can perform a large number of different tasks while taking up minimum space and weight during transport. Reconfigurable modular robotic systems have been of keen interest due to their improved ability to overcome obstacles and perform more tasks using a single hardware platform.

Toward this goal, researchers have investigated homogenous robotic modules for reconfigurable manipulation, mobility, or combinations therein. Homogeneity can reduce maintenance, offer increase robustness through redundancy, provide compact and ordered storage, and increase adaptability. Modularity can suit the system to compact and ordered storage, which can be critical for military and space deployment.

The use of compliant frame modules can further increase a modular robot's usefulness. Compliant frames allow a robotic system to change its shape by deflecting the frame module to achieve a near infinite number of different steering and maneuverability strategies. Likewise, the compliant frame modules allow the axles to deflect in order to accommodate terrain variations.

A robotic modular wheeled robot with a compliant frame may be reconfigured to perform tasks such as reconnaissance, transporting of goods, and search and rescue. Using the compliant frame, the robot can overcome unexpected terrain challenges and accomplish its mission. Such a robot may be used on an extraterrestrial mission to Mars or one of Jupiter's moons, where modularity would allow the robot to replace modules that cease to function properly.

Although the flexibility of the compliant frame system can enhance the capability of the robot, it provides a significant additional complexity in the control of the robot. Previous control functions derived for rigid robotic systems can fail to properly control modular robotic systems with compliant frames.

An additional challenge is presented in controlling a reconfigurable modular robot. As the configuration of the robot is changed, different ways in which the robot may move are provided. Control functions must be adapted whenever the configuration of the robotic system is changed, adding an additional level of difficulty.

SUMMARY OF THE INVENTION

The invention includes a method of controlling motion of a robot system, wherein the robot system includes a plurality of individual wheeled robot modules interconnected by at least one compliant member. The method may include developing a kinematic model of the robot system for translating between planned robot system motion and individual wheeled robot module motion commands. The kinematic model may be based on a combination of kinematic characteristics of the plurality of wheeled robot modules and stiffness properties of the at least one compliant member.

Additional features and advantages of the invention will be apparent from the detailed description which follows, taken in conjunction with the accompanying drawings, which together illustrate, by way of example, features of the invention.

DETAILED DESCRIPTION

Figure 1:
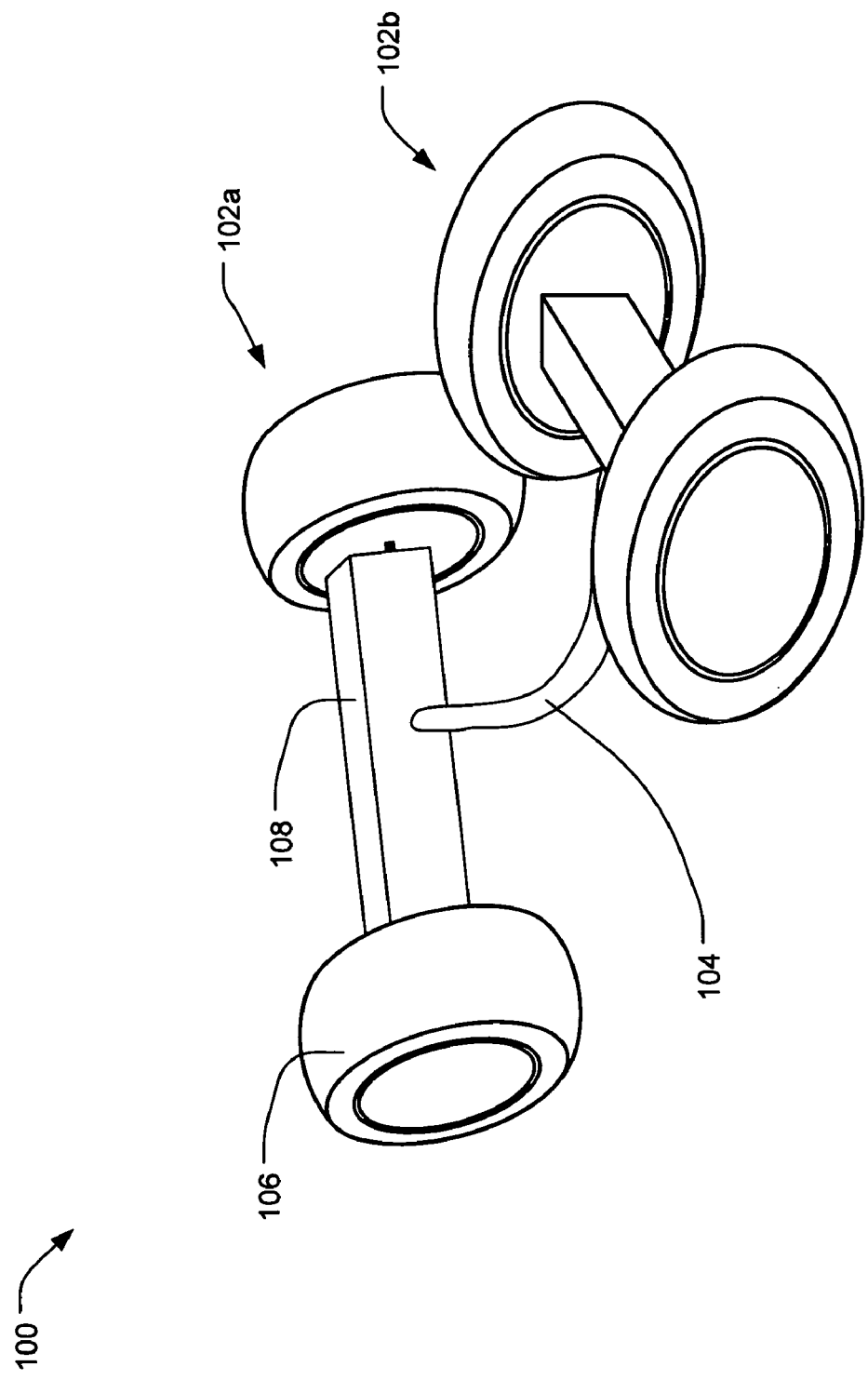
FIG. 1 is a illustration of a two-axle robot system in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In accordance with an embodiment of the present invention, a robot system is illustrated in FIG. 1. The robot system, indicated generally at 100, includes a plurality of individual wheeled robot modules 102, for example two individual wheeled robot modules 102a, 102b as illustrated. The individual robot modules may be interconnected by a partially compliant member 104. The partially compliant member may include a flexible beam which allows large deflections in at least one dimension and provides a returning force. Hence, forces can be transmitted between individual wheeled robot modules interconnected by the partially compliant member.

The individual robot modules 102 may include a drive means, for example axle-driven wheels 106 as illustrated. Deflection of the partially compliant member 104 may thus be controlled by coordinated action of the individual wheeled robot modules connected to opposite sides of the partially compliant member.

The robot system 100 may also include a control system in communication with the plurality of individual wheeled robot modules. The control system may, for example, include computer processing electronics. The control system may, for example, be mounted to one of the plurality of individual wheeled robot modules. For example, the individual wheeled robot module may include an axle assembly 108 to which the control system is mounted. The control system is configured to translate a desired robot system motion into individual wheeled robot module motion commands. The control system uses a kinematic model obtained from a combination of kinematic characteristics of the individual wheeled robot modules and stiffness characteristics of the at least one partially compliant member. For example, lateral steering of the robot system may be accomplished by creating bending (in a yaw direction) by coordinated control of the two individual wheeled robot modules. For example, through coordinated control of the individual wheeled robot modules, wheel traction can be maximized, for example to minimize lateral skid forces. Such a steering algorithm may provide advantages, in situations such as a sensitive environmental location, over prior robots using skid steering. Of course, many other steering algorithms may be used for the robot system as discussed below.

The robot system 100 can provide enhanced maneuverability in narrow and winding environments as compared to previous robot systems using rigid frames. For example, the partially compliant member may be configured to provide compliance in one or more motion degrees of freedom. For example, the partially compliant member may be designed to accommodate deflection between the individual wheeled robot modules such as roll, pitch, or yaw, or a combination thereof. For example, the partially compliant member may include a rotary joint at each end of the partially compliant member to provide compliance. In another example, the partially compliant member may be formed from a strip of spring steel. In yet another example, the partially compliant member may be formed from super elastic alloy tube. Using a tubular configuration for the partially compliant member can provide an advantage in that wires maybe run down the middle of the tube. Many other suitable materials and configurations for the compliant member will occur to one of skill in the art having possession of this disclosure.

The partially compliant member can thus provide a suspension function, allowing the robot system to accommodate rough or uneven terrain. The robot system is thus highly controllable and steerable, with relatively few moving parts. The reduced parts count, relative to rigid frame robots may decrease maintenance requirements, probability of system failure, robot weight, and robot size. Reduced weight and size help to improve portability of the system and decrease space required for stowage. These benefits are especially critical in remote applications (such as planetary exploration) where transport and maintenance of hardware is difficult. Other useful applications of the robot system include forestry, agriculture, and military reconnaissance.

In one particular example, by providing a partially compliant member with compliance in a yaw direction, the individual wheeled robot modules 102 may be independently steered to provide advanced steering capability. Since each axle can be steered independently, the robot system 100 provides enhanced maneuverability and the capability to control the shape of the robot. In comparison to traditional rigid framed mobile robots, this flexibility is especially useful for maneuvering confined environments and adapting to rough terrain.

Describing the individual wheeled robot modules 102 in further detail, in one embodiment, the individual wheeled robot may include a substantially rigid axle 108. The individual wheeled robot module may also include wheels 106 rotationally connected to each side of the substantially rigid axle. The compliant member 104 may be connected between the substantially rigid axles, for example to the approximate center of the substantially rigid axles. The individual wheeled robot modules may be differentially steered. The individual wheeled robots may include a self contained power source, such as a battery or fuel cell.

Figure 2A:
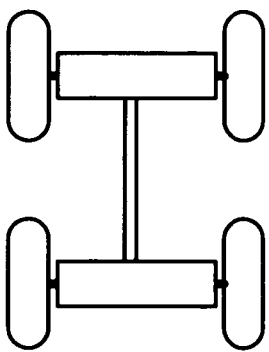
FIGS. 2a, 2b and 2c illustrations of several robot systems of different configurations in accordance with embodiments of the present invention.
Figure 2B:
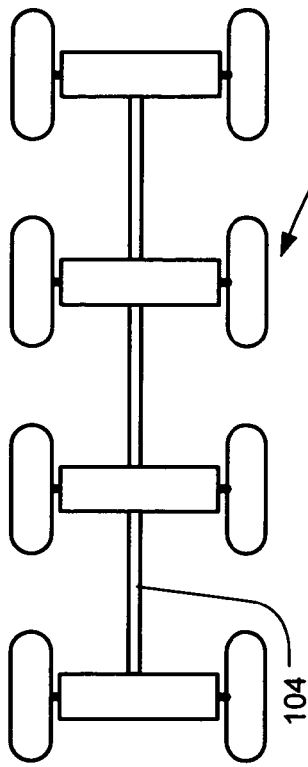
Figure 2C:
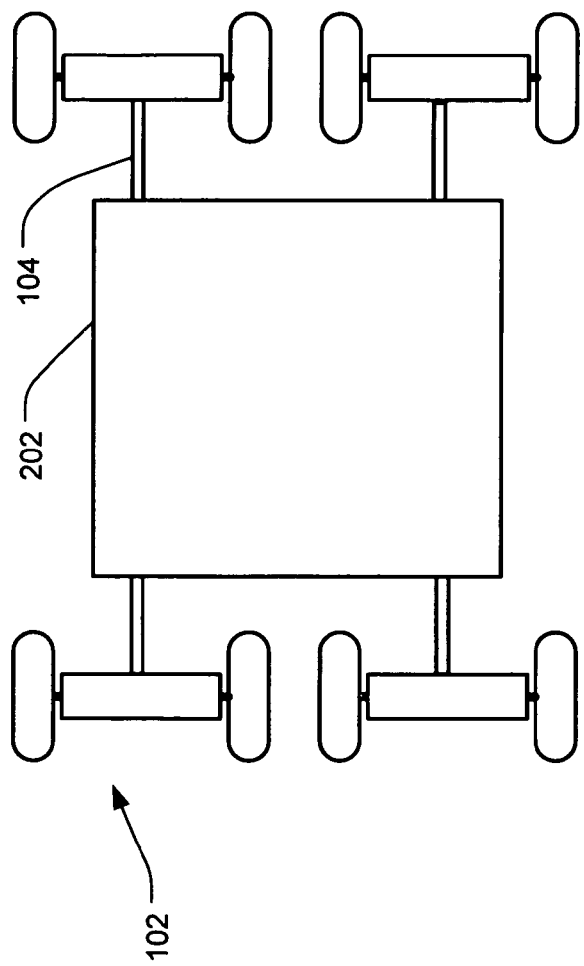

More generally, a robot system may include a number of individual robot modules, some of which are interconnected by a partially compliant member. For example, FIG. 2 illustrates a collection of exemplary robot systems assembled from a combination of individual wheeled robot modules 102 and partially compliant members 104 in accordance embodiments of the present invention. A first configuration shown in FIG. 2a is referred to as a "two-axle scout" and is similar to that illustrated in FIG. 2. A second configuration shown in FIG. 2b is referred to as a "four-axle train" and is assembled by connecting four individual wheeled robot modules 102 by three partially compliant members 104. Of course, longer vehicle trains can be assembled using additional modules and partially compliant members. A third configuration shown in FIG. 2c is referred to as a "four-axle array/platform" and includes a platform 202 coupling the four individual wheeled robots by four partially compliant members.

The scout configuration may prove useful for reconnaissance, exploration, and hauling of limited payloads. In space exploration, such a configuration would be well suited to support a manipulator and collect geological samples, carry tools, or explore planetary terrain in order to identify interesting geological sites. A multi-axle vehicle train, for example the four-axle train, can provide improved hauling capability over the scout configuration while still handling narrow and winding terrain.

Various other configurations can be assembled, optionally also including couplings between modules which are non-compliant (e.g. rigid members) or non-force transmitting (e.g. flexible). The collection of couplings between the individual wheeled robots is referred to as the frame, hence the robot systems as illustrated may be said to have a partially compliant frame.

The modularity of the system allows it to be reconfigured as needed, providing small or large configurations as dictated by the needs of the mission. This is a significant advantage over prior fixed frame robots which are limited to one specific configuration that may be too large for scouting activities in confined areas and too small for larger transport tasks. For example, two two-axle scouts can be coupled together with an additional partially compliant member to form a four-axle train. In the case of planetary exploration, modularity may allow an astronaut to easily reconfigure their robotic system to haul a larger payload for construction or an extended field exploration where more supplies would be required. Once reaching a remote site, the astronaut could then reconfigure the system to operate as multiple scout units for assisting with sample collection, transport, or scouting. Reconfiguration of the system into a platform arrangement, e.g. a four-axle array/platform, may allow transport of even larger objects, such as solar arrays, antennae, or fuel cells, which may realistically require relocation during a mission due to unanticipated environmental conditions. For example, given four sets of axle and frame modules, a crew could configure them to form two rovers, a four-axle vehicle train, or a four-axle moving platform.

The benefits of reconfigurability may also be advantageously applied to agricultural and mining types of activities where hauling larger quantities of material through winding environments is necessary. This maneuverability would be especially useful during initial debris removal stages of search and rescue operations where access is limited. Of course, the robot system maybe advantageously applied in many other fields as well.

Generally, the individual wheeled robot modules are homogenous, but this is not required as discussed further below. Homogeneity of the modules may reduce maintenance, offer increased robustness through redundancy, provide compact and ordered storage, and increase the adaptability of the robot system. For example, if a large robot system comprising many individual wheeled robot modules needs to travel through a constricted area, it may disassemble itself into a number of smaller two-axle scouts, pass through the constricted area, and then reassemble on the other side.

Returning to the discussion of the control system, the control system may include a compliant control model configured to control the robotic system. The compliant control model may include scalable dynamic models and a modular modeling structure as discussed further below. The compliant control model may also include at least one dynamic control model as discussed further below.

The control system may be implemented in a variety of ways, including for example an electronics system. For example, the control system may be implemented on a microprocessor using software stored in a computer readable storage medium. As discussed above, the control system may, for example, be mounted to one of the plurality of individual wheeled robots. The desired robot system motion may be input to the control system either from an autonomous robot navigation system (e.g. vision sensors and associated processing), or from an external robot motion system command (e.g. a user interface). The desired robot system motion may be input to the control system through a cabled or wireless interface. The control system may determine individual wheeled robot module motion commands to effectuate the desired robot system motion. The desired robot system motion may include desired robot poses or configuration changes as well, in which case the individual wheeled robot module motion command may include particular operations such as coupling or uncoupling, or actuating manipulators attached to the individual wheeled robot module. The control system may include a communication link to communicate individual wheeled robot module motion commands to the individual wheeled robot modules. The communication link may be provided using a wired or wireless link. For example, a wireless link may prove advantageous where the individual wheeled robot modules are coupled and decoupled to change the configuration of the robot system, since no wiring between the modules need be disconnected and reconnected.

Alternately, the control system may be located external to the robot system, for example at a fixed location, and communicate with the robot system through a wired tether or wireless communication links. As another alternative, the control system may be physically distributed across the plurality of individual wheeled robots so that each individual wheeled robot module has a portion of the control system. For example, each individual wheeled robot module may include a control module which performs a portion of the processing for the control system and provides individual wheeled robot module motion commands to the drive means of the individual wheeled robot module to which it is included. The control module may be in communication with at least one other control module in order to cooperatively perform the control system processing. The robot system may include a communication network to communicate the desired robot system motion and the individual wheel robot module motion commands between the plurality of individual wheeled robot modules.

Figure 3:
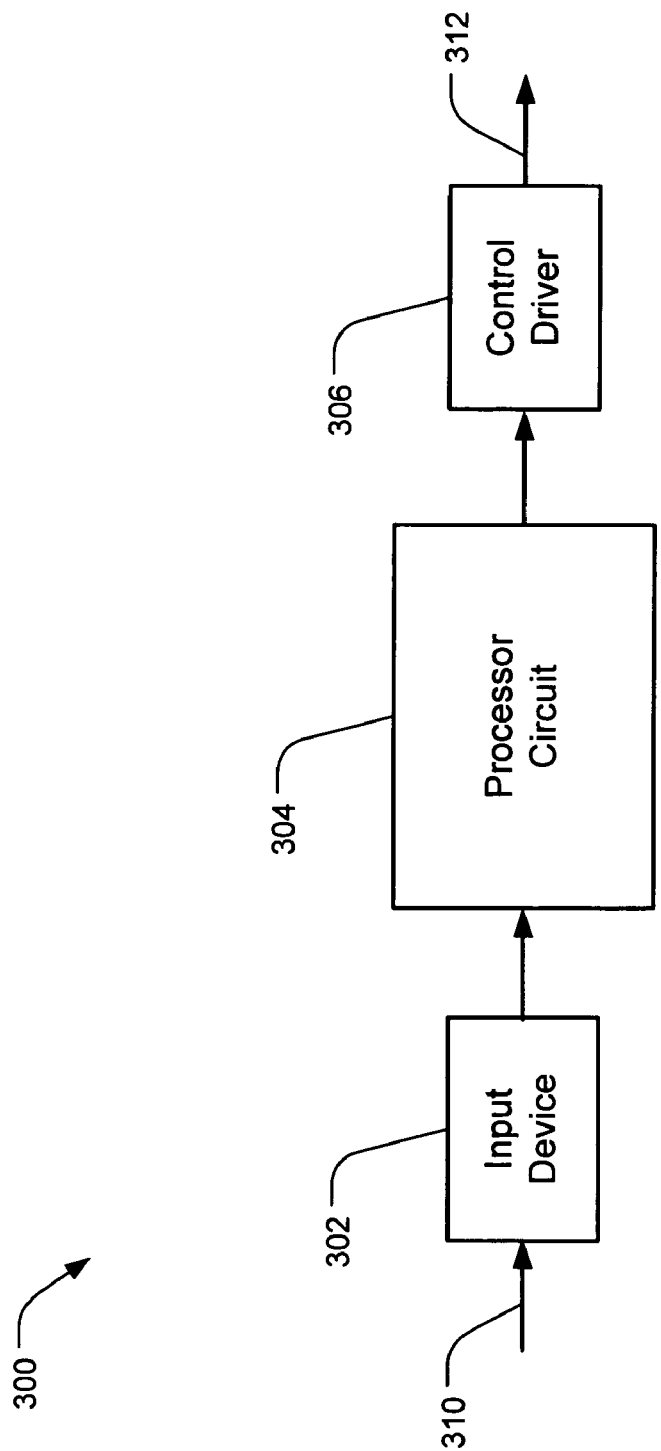
FIG. 3 is an illustration of a module controller for a robot system in accordance with an embodiment of the present invention.

In accordance with an embodiment of the present invention, a module controller for a robot system is illustrated in FIG. 3. The module controller 300 includes an input device 302 configured to receive a desired robot system motion 310. For example, the input device may be a wireless link, wired tether, or user interface as discussed above.

The module controller also includes a processor circuit 304 coupled to the input device and configured to determine at least one output control value 312 to control motion of at least one individual robot system module. The processor circuit develops the at least one output control value from a kinematic model of the robot system. As discussed in further detail below, the kinematic model of the robot system may be based on a combination of kinematic characteristics of the individual wheeled robot modules and stiffness properties of the at least one compliant member. For example, the control system may translate a desired robot system motion into individual wheeled robot module motion commands as discussed further herein.

The module controller may also include at least one control driver coupled 306 to the processor circuit 304 and configured to output the at least one control value to at least one of the drive means. For example, the control driver may provide drive current directly to the drive means of the individual wheeled robot to cause the individual wheeled robot to move in accordance with an individual wheeled robot motion command.

Embodiments of the compliant control model will now be discussed in further detail. Control of a robot system in general includes functions such as path planning, dynamic control, and sensor instrumentation. One aspect of the compliant control model is the inclusion of a scalable dynamic model.

Figure 4:
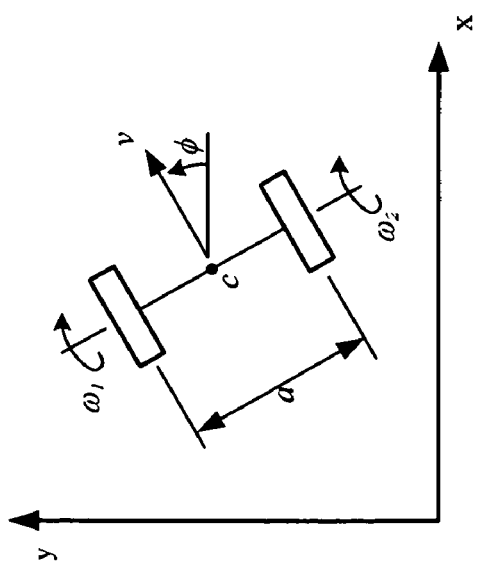
FIG. 4 is a diagram depicting axle module kinematics in accordance with an embodiment of the present invention.

Given the modular format of the proposed system, it is convenient to consider its kinematics and dynamics from a modular perspective. At the modular level, the system consists of similar axle and frame modules that can be connected interchangeably to form different configurations. For example, in one embodiment, each axle module in the system may include an individual wheeled robot module 102 (FIG. 1). The axle modules may be in the form of a differentially steered unicycle type mobile robot. The kinematics of the individual wheeled robot module in a global coordinate frame illustrated in FIG. 4 are described by, $$\begin{bmatrix} \nu \\ \dot{\phi} \end{bmatrix} = \frac{r}{2} \begin{bmatrix} 1 & 1 \\ -\frac{1}{\alpha} & \frac{1}{\alpha} \end{bmatrix} \begin{bmatrix} \omega_1 \\ \omega_2 \end{bmatrix} \quad (1)$$

Motion planning and dynamic control of this type of individual module is known to one of skill in the art. A typical dynamic model for a single module takes the form of, $$M(q)\ddot{q} + V(q,\dot{q}) = B(q)\tau - A^T(q)\lambda \quad (2)$$

where $q=\{x,\phi\}^T$ represents the configurations states of the system and M, V, B, and A represent the inertial, Coriolis, propulsive, and nonholonomic interactions, respectively. Various techniques are known for dynamic control of this module in order to drive it along a prescribed path or to a final location, including for backstepping, adaptive control, neural networks, or combinations therein. The structure of the module is rigid in the aforementioned cases, and the dynamic model typically does not include stiffness terms.

The kinematics of the robot system are quite a bit more complex, since there are multiple modules and compliant members between them. In particular, large deflections and post-buckling conditions can occur in the robot system. To adapt this dynamic model to the robot system including compliant members, the compliant coupling is taken into account. The compliant coupling enters as an additional force, $F=K(q)q$, on the left hand side of Eq. (2). This results in a generic form of the equation, $$M(q)\ddot{q} + V(q,\dot{q}) + K(q)q = B(q)\tau - A^T(q)\lambda \quad (3)$$

where the matrices M, V, B, and A are assembled from the individual axle models shown in Eq. (2), and K is a stiffness matrix describing the compliant coupling between the axle modules. The q and $\tau$ vectors now represent the assembled configuration states and input torques of all the axle modules, respectively. For example, the dynamic model for a two-axle scout configuration (FIG. 2a), takes the form of, $$\begin{bmatrix} M_1(q) & 0 \\ 0 & M_2(q) \end{bmatrix} \begin{Bmatrix} \ddot{q}_1 \\ \ddot{q}_2 \end{Bmatrix} + \begin{bmatrix} V_1(q_1,\dot{q}_1) \\ V_2(q_2,\dot{q}_2) \end{bmatrix} + \begin{bmatrix} k_{11}(q) & k_{12}(q) \\ k_{21}(q) & k_{22}(q) \end{bmatrix} \begin{Bmatrix} q_1 \\ q_2 \end{Bmatrix} = \quad (4)$$
$$\begin{bmatrix} B_1(q_1) & 0 \\ 0 & B_2(q_2) \end{bmatrix} \begin{Bmatrix} \tau_1 \\ \tau_2 \end{Bmatrix} - \begin{bmatrix} A_1^T(q_1) & 0 \\ 0 & A_2^T(q_2) \end{bmatrix} \begin{Bmatrix} \lambda_1 \\ \lambda_2 \end{Bmatrix}$$

where the M, B, and A matrices are diagonal due to the independent nature of the axles and the fact that the effective inertia of the frame is so small in comparison to that of the axles. Hence, the term coupling the dynamics of the axle modules is stiffness matrix K, derived from the model of the compliant frame. Analysis of the system considering the continuous form of the beam model indicates that this discrete approximation of the frame element is appropriate given the relative inertia of the frame. Hence, only the low order dominant modes of frame vibration excite motion of the axles and the discrete stiffness model captures these sufficiently.

In its simplest form, the stiffness matrix K describing the compliant frame coupling can be described by the Plane Frame Element used in the Finite Element Method (FEM) assuming that the frame has undergone small deflections relative to a straight configuration. Such a model of the frame is described in its local coordinate system by the sub-matrices, $$K_{11} = \begin{bmatrix} \frac{EA}{l} & 0 & 0 \\ 0 & \frac{12EI}{l^3} & \frac{6EI}{l^2} \\ 0 & \frac{6EI}{l^2} & \frac{4EI}{l} \end{bmatrix}, K_{22} = \begin{bmatrix} \frac{EA}{l} & 0 & 0 \\ 0 & \frac{12EI}{l^3} & -\frac{6EI}{l^2} \\ 0 & -\frac{6EI}{l^2} & \frac{4EI}{l} \end{bmatrix}, \quad (5)$$

$$K_{21} = K_{22}^T = \begin{bmatrix} -\frac{EA}{l} & 0 & 0 \\ 0 & -\frac{12EI}{l^3} & \frac{6EI}{l^2} \\ 0 & -\frac{6EI}{l^2} & \frac{2EI}{l} \end{bmatrix}$$

where the lower-right 2×2 elements of these matrices describe the Euler bending and transverse stiffness of frame and the upper-left 1×1 elements represent the axial stiffness. This axial term assumes that the frame is near to straight, which may not be the case while the robot performs a steering maneuver and the axial stiffness of the frame is greatly reduced. This reduction is due largely to the fact that as the axles rotate in order to change heading, the frame is placed in a post-buckling type of configuration and its axial compression forces are reduced substantially. Hence, traditional stiffness models can poorly model the dynamics of the system while performing turning maneuvers. A non-linear post-buckling Finite Element Model may therefore be used for prediction of frame stiffness. One such model based upon energy balance is described by R. Szilard, "Critical load and post-buckling analysis by FEM using energy balancing technique," Computers and Structures, 20(1-3), p277-86, 1985 and is may be used for prediction of post-buckling conditions without iterative calculations typical of such models. This model allows the stiffness matrix to be calculated by, $$K(q) = K^L + K_I^{NL}(q) + K_{II}^{NL}(q) \quad (6)$$

where $K^L$ is the linear stiffness matrix described previously, and $K_I^{NL}$ and $K_{II}^{NL}$ are nonlinear stiffness matrices used to compensate the axial and bending stiffnesses, respectively.

The dynamic model of the robot system may be constructed by substituting this non-linear stiffness matrix into the dynamic model, Eqs. (3) and (4). Hence, the compliance control model may account for post-buckling deflection of the compliant member. As discussed below, sensor algorithms can be integrated with force sensing on the compliant member during operation to evaluate the accuracy of this information.

The dynamic model, Eq. (3), can be extended to represent multiple configurations of the robot system (e.g. as illustrated in FIG. 2). This can be accomplished by assembling the system model as will now be described. Each individual wheeled robot module (e.g. an axle module) and its coordinates $q_i$ represent a node location in the system as described by the M, V, B, and A matrices. The stiffness matrix K then represents the frame configuration of the system, which can be constructed by assembling the individual frame element matrices in order to assure appropriate coupling between the axle modules. Although most directly used for control of the robot system, broader applications of the modular compliantly coupled nonholonomic model can be used for group behavior and coordinated control of robot teams. The compliance terms can be viewed as a method of applying virtual forces to the robots in order to assure their cooperative behavior and nonlinearities can represent desired variations in behavior based upon configuration.

The individual wheeled robot modules may be substantially identical (differing, for example, due to manufacturing tolerances and wear), in which case the system model uses one scalable kinematic model corresponding to the individual wheeled robot modules in the above derivation. The technique may also be applied to a system using dissimilar modules. In such a case, each of the different individual wheeled robot module configurations will have its own corresponding scalable kinematic model which is plugged into the above derivation. For example, a robot system constructed from N different module configurations may use N different scalable kinematic models corresponding to the N different module configurations.

Figure 5:
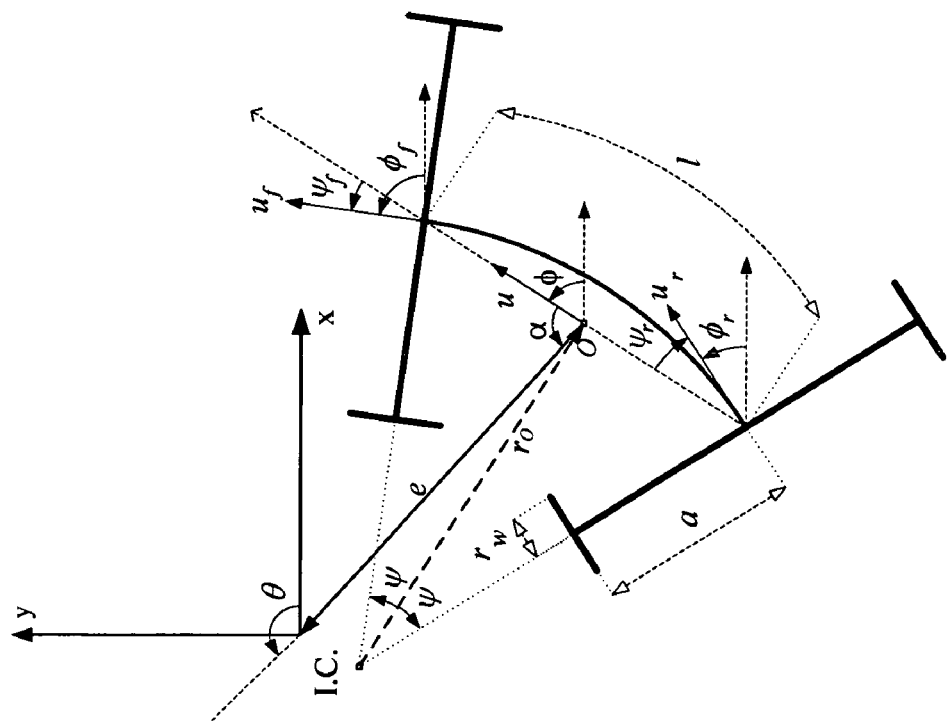
FIG. 5 is a diagram depicting compliant framed mobile robot kinematics in accordance with an embodiment of the present invention.

A more detailed example is now provided for the two-axle scout configuration (FIG. 2a). In one embodiment, the motion planning can be constrained to minimize wheel traction forces and thus provide maximum control authority to the robot system. This may be accomplished by limiting the applied forces to the frame (compliant members) to pure bending moments. A benefit of this technique is that it allows the robot to achieve a small turning radius for maneuvering in confined environments. This configuration can be achieved by rotating the axles of the robot by equal and opposite angles, q relative to the line segment connecting the two axles of the robot, where the coordinate geometry is illustrated in FIG. 5. The midpoint of this line, O, is described in terms of polar coordinates (e, $\alpha$, $\theta$). The planning algorithm drives this point to the origin (0,0,0) with the vehicle in a final straight configuration ($\psi$=0, $\alpha$=0). Realization of this planning algorithm is possible by first noting that the turning radius and path curvature of the robot system are, $$r_O = \frac{1}{2\psi}\cos\psi \quad c = \frac{1}{r_O} = \frac{2\psi}{l\cos\psi} \tag{7}$$

which provide a direct correlation between path curvature, c, that will be provided by the motion planner and the corresponding axle heading, $\psi$, that is controlled by axle level controller. The planning algorithm is thus approached purely from the aspect of driving point O to the origin by controlling its path curvature and forward velocity. As it turns out, resulting curvature based techniques are desirable since they produce only pure bending moments applied to the frame and consequent traction forces are minimized. Energy is therefore conserved and control authority is maximized.

Representing the motion of point O in polar coordinates and using a bicycle type model, its kinematic equations can be expressed as, $$\dot{e} = -u\cos\alpha \tag{8}$$

$$\dot{\alpha} = -u\left(c - \frac{\sin\alpha}{e}\right)$$

$$\dot{\theta} = u\frac{\sin\alpha}{e}$$

where the forward velocity u, and the path curvature, c, are control variables. The advantage of this polar like representation is that the states $\alpha$ and $\theta$ are not defined for e=0 and the controller becomes discontinuous at the origin. Hence, Brocketts Theorem does not hold and a smooth time invariant state feedback control law, such as (9), can provide global asymptotic stability. The Lyapunov function $$V \equiv \frac{1}{2}(\alpha^2 + h\theta^2)$$

can then be used to derive the desired control inputs, $$u_D = \gamma e : sat(\gamma e, \bar{u}) \tag{9}$$

$$c_D = \frac{\sin\alpha}{e} + h\frac{\theta}{e}\frac{\sin\alpha}{\alpha} + \beta\frac{\alpha}{e}$$

which can be shown to asymptotically stabilize the system to the origin. In our initial research, however, we found that this control law can produce unrealistic initial values of u and c. Hence, we extended the dynamics of these variables in order account for initial conditions and tracking error, and applied Baccotti's theorem 19.2 (A. Bacciotti, *Local stabilizability of nonlinear control systems*, SERIES ON ADVANCES IN MATHEMATICS FOR APPLIED SCIENCES, Vol. 8: World Scientific, 1991) to prove asymptotic stabilization about the origin. The resulting extended dynamics appear as error variables U and C, $$U = u - u_D$$

$$u = U + u_D$$

or $$C = c - c_D$$

$$c = C + c_d \tag{10}$$

where u and c are the actual curvature and velocity, and $u_D$ and $c_D$ are the desired terms determined by Eq. (9). Taking the derivative of these equations and defining an exponentially stabilizing control law results in, $$\dot{U} = -k_u(u - u_D) = -k_u U$$

$$\dot{C} = -k_C(c - c_D) = -k_C C \tag{11}$$

where $k_u$ and $k_c$ are positive real parameters. Hence, as the error terms U and C are driven to zero, the actual inputs take the form of the desired inputs, and according to Baccotti's theorem 19.2, the system will stabilize about the origin since the original system was asymptotically stabilized about the origin.

The compliant control model can accommodate different steering approaches. For example, the two-axle scout can be steered in a car like fashion, where only the front module is steered. The pure-bending constraint on the compliant member is relaxed, and the resulting steering approach produces moment and transverse force on the beam.

Other constraints may be applied as appropriate for different applications. For example, predefined mechanical constraints may be applied to limit bending force in certain directions (e.g. roll, pitch, and yaw), or to limit bending force to certain maximum quantities.

Figure 6:
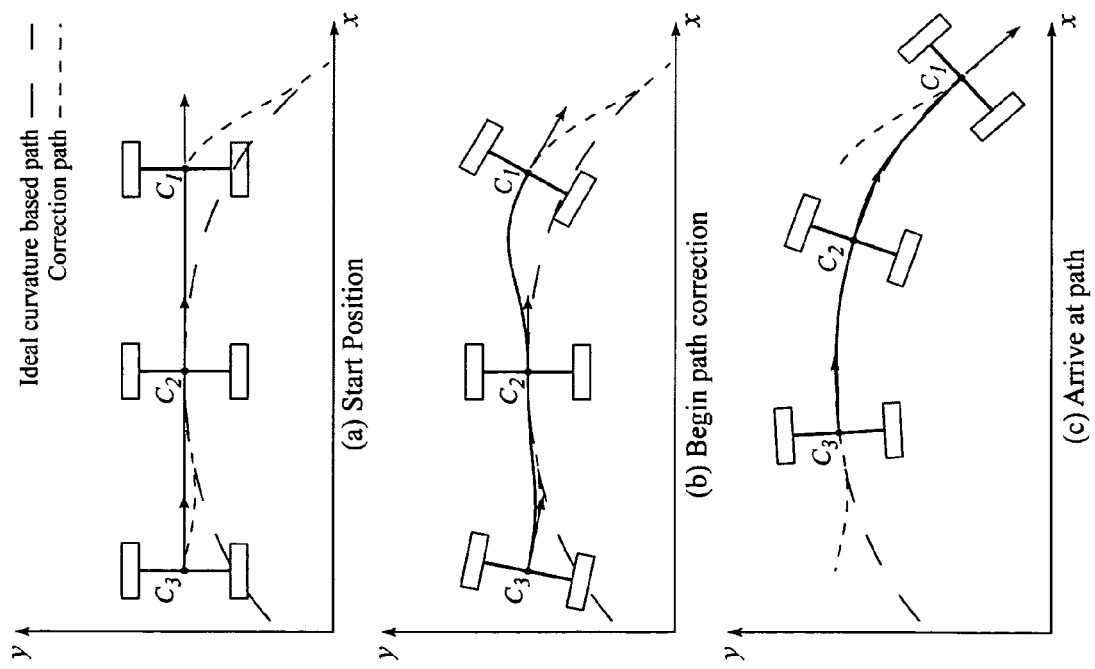
FIG. 6 is a diagram depicting path correction in a train format robot system in accordance with an embodiment of the present invention.

The robot may consist of more than two modules, as discussed above, in which case a system kinematic model may be derived. With more than two axle modules, nonholonomic constraints prevent the axles from directly changing the robot's path curvature by simply modifying their heading, as was the case of the scout configuration. An additional level of motion planning may be used to alter the path of the more complicated system configurations in order to follow the optimal paths prescribed by the curvature-based planners. For example, FIG. 6 illustrates one approach for steering a three-train onto a desired path where the curvature algorithm is tied to the middle module. The leading and trailing modules are thus slaved to the middle module. From an initial starting point shown in (a), path correction may steer each of the individual modules separately as shown in (b), to converge onto the desired path as shown in (c). In general, the curvature algorithm may be tied to any module or location on the system. In configurations where one module is chosen as a master, manual control may be simplified since a user interface, such as a joystick, steering wheel, or computer program, can be used to steer the entire system. The desired robot system motion is communicated to the master module, and the remaining modules throughout the system coordinate and optimize their behavior with respect to master module.

Figure 7:
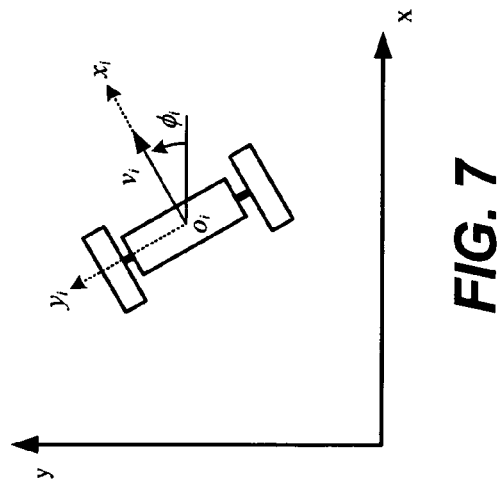
FIG. 7 is a diagram showing the $i^{th}$ axle module kinematics of a robot system in accordance with an embodiment of the present invention.

A system kinematic model of the robot system may be obtained by combining the kinematic model for the individual wheel robot modules with the stiffness properties of the compliant members as will now be discussed. Consider an n-axle robot system, where the $i^{th}$ axle kinematics is as shown in FIG. 7. Let us define a fixed global reference frame $F(X,Y)$ and moving frames $f_i(x_i,y_i)$ attached to the points $O_i$ at the midpoint of the $i^{th}$ axle, where $i=1 \ldots n$. At any instant, the $i^{th}$ axle module is rotating about the ICR (Instantaneous Center of Rotation) as shown in FIG. 7 such that the ICR's projections onto the $x_i$ axes defines point $O_i$ at the midpoint of each axle. A module configuration vector $q_i=[X_i \ Y_i \ \phi_i]$ is then attached to this point and oriented with the axle. In order to describe this configuration within the context of the entire system, we assemble each of these module configuration vectors into a system configuration vector $Q=[q_i, \ldots, q_n]^T$ where $Q \in R^{3n \times 1}$. It is then possible to assemble a system description of the form, $$M(Q)\ddot{Q}+V(Q,\dot{Q})\dot{Q}+F(\dot{Q})+G(Q)+\tau_d+F_K(Q)=E(Q)\tau-A^T(Q)\lambda \quad (12)$$

where $M(Q) \in R^{3n \times 3n}$ is a symmetric, positive definite inertia matrix assembled from the individual axle module inertia matrices. Assembling individual axle module dynamic characteristics into the system model we have $V(Q,\dot{Q}) \in R^{3n \times 3n}$ is the centripetal and coriolis matrix, $F(\dot{Q}) \in R^{3n \times 1}$ denotes the friction vector, $G(Q) \in R^{3n \times 1}$ is the gravitational vector, $\tau_d$ denotes bounded unknown disturbances including unstructured unmodelled dynamics, $E(Q) \in R^{3n \times 2n}$ is the input transformation matrix, $\tau \in R^{2n \times 1}$ is the input torques, and $\lambda \in R^{m \times 1}$ is the vector of constraint forces. Compliant frame elements are described by globally defined stiffness equations that are assembled into $F_K(Q) \in R^{3n \times 1}$. Below, we derive each of the relevant matrices individually and provide an example of how they are assembled for a two-axle scout using exemplary parameters listed in TABLE 1 and kinematic model parameters illustrated in FIG. 8. Points $O_1$ and $O_2$ are thus specified by the vector $Q=[q_1 \ q_2]^T$ where $q_1=[X_1 \ Y_1 \ \phi_1]^T$ and $q_2=[X_2 \ Y_2 \ \phi_2]^T$ are the global reference positions used to develop the mathematical models.

The nonholonomic constraints of a differentially steered axle state that any axle can only move in a direction normal to the axes of the driving wheels assuming pure rolling without slip such that, $$|\dot{x}_i|=|\dot{y}_i/\phi_i|=0 \quad (13)$$

From Eq. (13), the nonholonomic constraints of an axle module can be expressed as $$-\dot{X}_i \sin \phi_i + \dot{Y}_i \cos \phi_i = 0 \quad (14)$$

In matrix form, this is then, $$A_i(q_i)\dot{q}_i=0 \quad (15)$$

where $A_i(q_i) \in R^{1 \times 3}$ is the matrix associated with the $i^{th}$ axle nonholonomic constraints. The axle constraints are then expressed as follows and assembled in the global $A(Q)$ matrix as shown, $$A_i(q_i) = [-\sin \phi_i \ \cos \phi_i \ 0], \ A(Q) = \begin{bmatrix} A_1(q_1) & 0 \\ 0 & A_2(q_2) \end{bmatrix} \quad (16)$$

where $A(Q) \in R^{m \times 3n} = R^{2 \times 6}$ for this two axle case such that $$A(Q)\dot{Q}=0 \quad (17)$$

TABLE 1

Prototype of a Two-Axle Scout Configuration

| Parameter | Value | Units | Description |
|---|---|---|---|
| $r_w$ | 0.073 | meters | Wheel radius |
| a | 0.162 | meters | Axle width (half) |
| $m_i$ | 4.76 | Kg | Mass of each axle |
| $J_i$ | 0.0186 | Kg/m² | Mass moment of inertia of each axle |

Let $S(Q) \in R^{3n \times 2n} = R^{6 \times 4}$ then be a full rank matrix formed by a set of smooth and linearly independent vector fields spanning the null space of such that $$A(Q)S(Q)=0 \quad (18)$$

Eqs. (17) and (18) imply the existence of a 2n dimensional velocity vector $v(t) \in R^{2n \times 1} = R^{4 \times 1}$ such that, for all t, $$\dot{Q}=S(Q)v(t) \quad (19)$$

and $S(Q)$ and $v(t)$ in Eq. (19) can be expressed as $$S_i(q_i) = \begin{bmatrix} \cos \phi_i & 0 \\ \sin \phi_i & 0 \\ 0 & 1 \end{bmatrix}, \ S(Q) = \begin{bmatrix} S_1(q_1) & 0 \\ 0 & S_2(q_2) \end{bmatrix} \quad (20)$$

$$v_i(t) = [v_i \ \omega_i], \ v(t) = [v_1 \ v_2]^T \quad (21)$$

where $v_i$ and $\omega_i$ represent the linear and at point $O_i$. The closed form of the forward kinematics defined by Eq. (19) of the two-axle robot system can then be expressed as:

$$\begin{bmatrix} \dot{X}_1 \\ \dot{Y}_1 \\ \dot{\phi}_1 \\ \dot{X}_2 \\ \dot{Y}_2 \\ \dot{\phi}_2 \end{bmatrix} = \begin{bmatrix} \cos \phi_1 & 0 & 0 & 0 \\ \sin \phi_1 & 0 & 0 & 0 \\ 0 & 1 & 0 & 0 \\ 0 & 0 & \cos \phi_2 & 0 \\ 0 & 0 & \sin \phi_2 & 0 \\ 0 & 0 & 0 & 1 \end{bmatrix} \begin{bmatrix} v_1 \\ \omega_1 \\ v_2 \\ \omega_2 \end{bmatrix} \quad (22)$$

where larger scale system descriptions can then be assembled similarly. The system model may be used for translating between a planned robot system motion and individual wheeled robot module motion commands.

Figure 9:
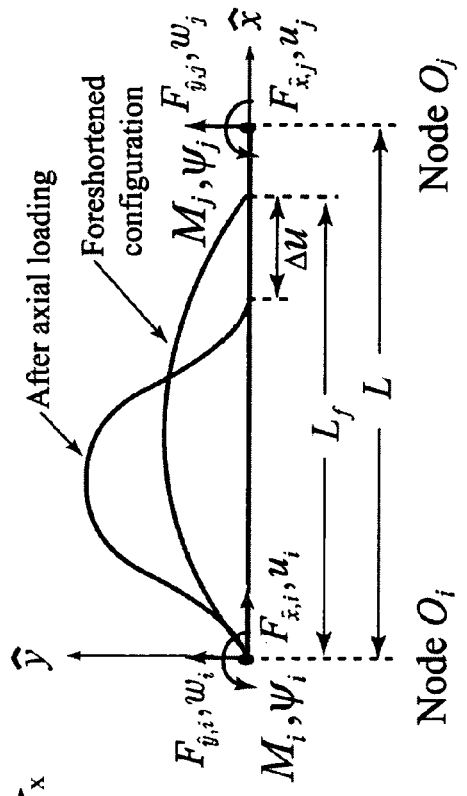
FIG. 9 is a diagram depicting the general configuration of a single-finite-element of the compliant frame member in accordance with an embodiment of the present invention.

An exemplary model of a compliant frame module will now be described. In has been discovered that, due to the relatively large inertias of the axles for the prototype configuration described above, the first two vibration modes of the compliant frame involved the motion of axles, while higher modes excited only the frame. These results assert that the dominant modes of system vibration, involving the axles alone, can be predicted by a single simple frame element connected between the principal coordinates describing the axle positions. Hence, the system dynamics can be described sufficiently by a single element without increasing the number of system states. In particular, a simple linear single frame element is modified to characterize the post-buckled configuration of the frame typical during steering maneuvers. The general configuration of the element is shown in FIG. 9 with prototype parameters listed in TABLE 2. As typical of FEM, we denote the displacements of the frame endpoints in vector form as, $$\delta_L = [u_i\, w_i\, \psi_i\, u_j\, w_j\, \psi_j]^T \tag{23}$$

where the i and j subscripts represent the two axle modules that are connected by the frame.

Figure 8:
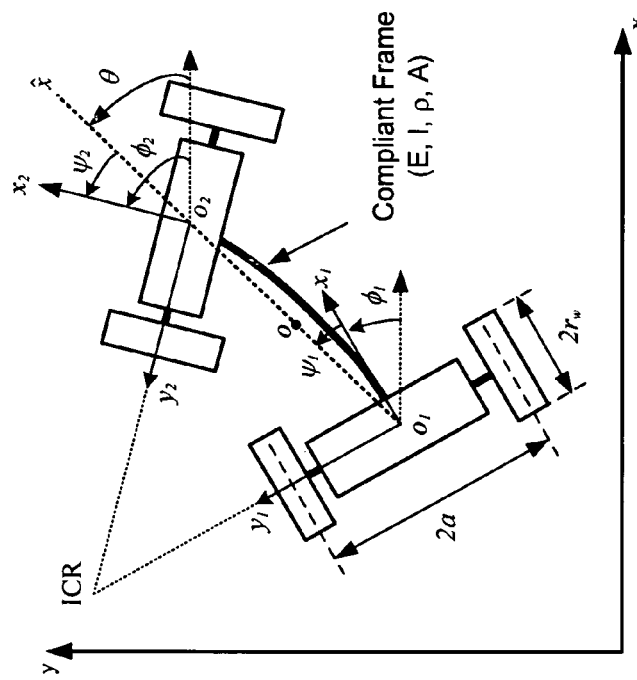
FIG. 8 is a diagram showing generalized compliant framed mobile robot kinematics in accordance with an embodiment of the present invention.

These displacements can be calculated from the node locations $O_i$ and $O_j$ by using the axle configuration vectors, $q_i$ and $q_j$, expressed in the local coordinate frame as, $$\hat{q}_i = R_\theta q_i = [\hat{q}_i(1)\ \hat{q}_i(2)\ \psi_i] \tag{24}$$

where $R_\theta$ is a standard rotation transformation matrix with $\theta$ defined as in FIG. 8 such that, $$R_\theta = \begin{bmatrix} \cos\theta & \sin\theta & 0 \\ -\sin\theta & \cos\theta & 0 \\ 0 & 0 & 1 \end{bmatrix} \text{ and } R = \begin{bmatrix} R_\theta & 0 \\ 0 & R_\theta \end{bmatrix}. \tag{25}$$

For convenience, we measure displacements relative to the $i^{th}$ node and describe $\delta_L$ as a function of the axle configuration vectors to provide, $$\delta_L = [0\ 0\ \psi_i\ \hat{q}_j(1) - \hat{q}_i(1) - L_f\ 0\ \psi_j] \tag{26}$$

where displacement is taken relative to the foreshortened length, $L_f$, resulting from the transverse frame deflection, $$L_f = L - \Delta L = L\left(1 - \frac{2\psi_1^2 - \psi_1\psi_2 + 2\psi_2^2}{30}\right) \tag{27}$$

Note that as a result of the local coordinate definition, $w_i = w_j = 0$. The forces acting on the frame can then be calculated to give local forces in the form of, $$F_L = K\delta_L \tag{28}$$

where K is the stiffness matrix to be derived in below. These forces are then expressed in the global coordinate frame by applying the composite rotation matrix R such that they can be used in the dynamic model, $$F_G = R^T F_L = R^T K \delta_L \tag{29}$$

TABLE 2

Parameters of an Exemplary Compliant Frame

| Parameter | Value | Units | Descriptions |
|---|---|---|---|
| L | 0.37 | meters | Length |
| w | 0.05 | meters | Width |
| t | 0.7 | mm | Thickness |
| E | $2.0 \times 10^{11}$ | Pa | Young's Modulus |
| A | $3.5 \times 10^{-5}$ | $M^2$ | Cross-sectional Area |
| p | $7.8 \times 10^3$ | $Kg/m^3$ | Density |
| I | $1.4292 \times 10^{-12}$ | $M^4$ | Area moment of inertia | such that the components of the force vector are, $$F_G(Q) = [F_{X,i}\, F_{Y,i}\, M_i\, F_{X,j}\, F_{Y,j}\, M_j]^T \tag{30}$$

which are then assembled into the appropriate rows of $F_K(Q)$ in the system dynamic equation. In the case of the two-axle case, we have $F_K(Q) = F_G(Q)$.

Generally, the axial force in a bar can be expressed as $F_{\hat{x}} = k\Delta u$ where the axial force is proportional to the axial deflection, $\Delta u$, and k denotes EA/L as the axial stiffness. However, for most cases, the compliant frame of the robot system is not straight due to steering maneuvers, and is essentially in a post-buckled shape. Although a multi-element nonlinear FEM can accurately describe the axial force of the complaint frame, this is complex. For simplicity, we use a post-buckled axial stiffness that is linear and allows for a simple solution.

The axial stiffness in post-buckling is modeled as $EI\pi^2/2L^3$, which is much more compliant than the traditional rigid bar model used in frame elements. The total axial deflection caused by post-buckling is $\Delta u = \hat{q}_j(1) - \hat{q}_i(1) - L_f$ and the axial force is then modeled as $$F_{\hat{x},1} = -F_{\hat{x},2} = \frac{EI}{2}\frac{\pi^2}{L^3}\Delta u. \tag{31}$$

These forces are then assembled into a frame element model [34] in place of the rigid axial stiffness such that, $$K = \begin{bmatrix} K_{11} & K_{12} \\ K_{21} & K_{22} \end{bmatrix} \tag{32}$$

$$K_{11} = \frac{EI}{L^3}\begin{bmatrix} \pi^2/2 & 0 & 0 \\ 0 & 12 & 6L \\ 0 & 6L & 4L^2 \end{bmatrix},$$

$$K_{11} = \frac{EI}{L^3}\begin{bmatrix} -\pi^2/2 & 0 & 0 \\ 0 & -12 & 6L \\ 0 & -6L & 4L^2 \end{bmatrix}$$

$$K_{21} = K_{12}^T,$$

$$K_{22} = \frac{EI}{L^3}\begin{bmatrix} \pi^2/2 & 0 & 0 \\ 0 & 12 & -6L \\ 0 & -6L & 4L^2 \end{bmatrix}$$

We now describe the dynamic equations of a single axle module, where frame forces are included. The equations of motion, where Lagrange multipliers $\lambda_i$ define nonholonomic constraints, are defined by, $$m_i \ddot{X}_i + F_{X,i} = \frac{1}{r_w}\cos\phi_i(\tau_{L,i} + \tau_{R,i}) + \lambda_i \sin\phi_i \quad (33)$$

$$m_i \ddot{Y}_i + F_{Y,i} = \frac{1}{r_w}\sin\phi_i(\tau_{L,i} + \tau_{R,i}) - \lambda_i \cos\phi_i \quad (34)$$

$$J_i \ddot{\phi}_i + M_i = \frac{a}{r_w}(-\tau_{Li} + \tau_{Ri}) \quad (35)$$

where $\tau_{L,i}$ and $\tau_{R,i}$ are motor torques acting on the left and right wheel, respectively. In some cases, simplification can be obtained by letting $V(Q,\dot{Q})=0$ where centripetal and coriolis forces are relatively small due to velocity magnitudes. Also, we can set $G(Q)=0$ if we assume motion of robot system is substantially in the horizontal plane. Eqs. (33)-(35) can be expressed in matrix form for the $i^{th}$ axle module as, $$M_i(q_i) = \begin{bmatrix} m_i & 0 & 0 \\ 0 & m_i & 0 \\ 0 & 0 & J_i \end{bmatrix} \quad (36)$$

$$E_i(q_i) = \frac{1}{r_w}\begin{bmatrix} \cos\phi_i & \cos\phi_i \\ \sin\phi_i & \sin\phi_i \\ -a & a \end{bmatrix}$$

where the wheel torques applied to the $i^{th}$ axle module are $\tau_i = [\tau_{L,i}\ \tau_{R,i}]^T$ and the Lagrange multipliers are determined by, $$\lambda_i = -m_i \dot{\phi}_i(\dot{X}_i \cos\phi_i + \dot{Y}_i \sin\phi_i) + F_{X,i}\sin\phi_i - F_{Y,i}\cos\phi_i \quad (37)$$

The axle module matrices can then be assembled into the system dynamic equations, which for the two-axle case study provides, $$M(Q) = \begin{bmatrix} M_1 & 0 \\ 0 & M_2 \end{bmatrix} \quad (38)$$

$$E(Q) = \begin{bmatrix} E_1 & 0 \\ 0 & E_2 \end{bmatrix}$$

and the torque vector applied to the entire system is, $$\tau = [\tau_1\ \tau_2]^T \quad (39)$$

In accordance with another embodiment of the present invention, the robot system may include instrumentation to provide posture sensing for use in the planning and stabilization algorithms. For example, instrumentation can help to limit the impact of non-systematic odometry errors and achieve the improved posture evaluation (both at the local and global level) with minimal drift. For example, the instrumentation may include providing each axle module with traditional wheel encoders, rate gyros, and accelerometers. Fusion of sensor data with the control model can be accomplished with a kinematic model Kalman filter capable of running independently on each module. For a discussion of kinematic model Kalman filters, see T. D. Larsen, et. al, "Design of Kalman filters for mobile robots; evaluation of the kinematic and odometric approach", *Proceedings of the* 1999 *IEEE International Conference on Control Applications,* Piscataway, N.J., USA, p1021-6 vol. 2, 1999.

Instrumentation of the compliant members may be accomplished with strain gages. Such sensors can enable the measurement of relative posture between axle modules and coupling forces internal to the system. Besides improving posture measurements, this data can also be used to augment and supplement the stiffness matrices described earlier. Preferably, a sensor providing force, moment, and posture estimates is used. To accommodate sensors which provide information without reference to the global coordinate frame (e.g. an observation of the relative pose (x, y, theta) of the two axles) a Covariance Intersection filter (CIF) can be used. Principles of CIF are provided by J. K. Uhlmann, et. al., "Nondivergent simultaneous map-building and localization using covariance intersection," Proceedings of the SPIE—The International Society for Optical Engineering, 3087, p2-11, 1997. The CIF may be used to correlate the frame data with the traditional sensor suit information. Calibration of strain sensors may also be included, for example fitting strain gauge data to a polynomial describing strain. Tying this polynomial into beam equations then provides relative position and force measurements. Using the free body diagram shown in FIG. 10, it can be shown that $$F_y = \frac{(-M_A + M_B)}{L} \quad (40)$$

Figure 10:
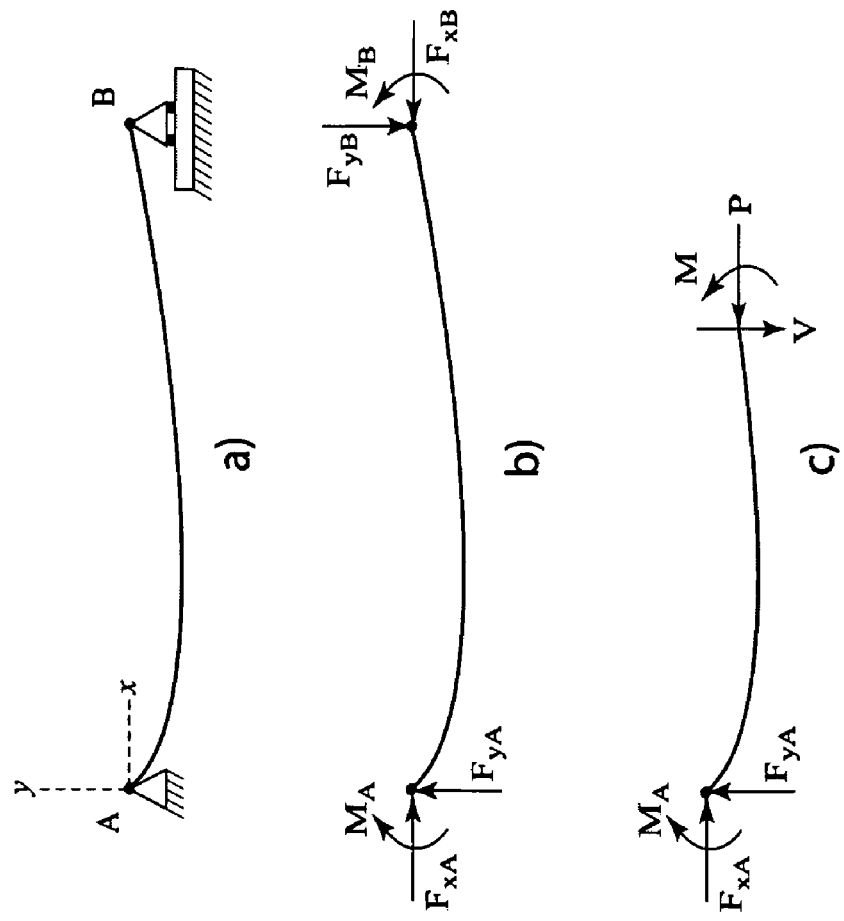
FIG. 10 a graph of three separate beam derivation diagrams in accordance with an embodiment of the present invention.

Making a cut in the frame and drawing a new free body diagram, as in FIG. 10(*c*), yields $$M(x) = M_A + F_y x + F_x y \quad (41)$$

where M(x) will be provided by an interpolation of the sensor data. This equation allows us to determine beam curvature and relative posture, as described below. The moments along the beam can be extrapolated from the strain gauge readings using the relationship below that relates all of the available strain data, $$M(x) = \frac{\varepsilon(x)EI}{y} \quad (42)$$

where y is the distance from the point of inflection of the internal beam strain and the upper surface of the beam (nominally half of the beam thickness), and $\epsilon(x)$ is a polynomial estimating the strain along the beam, $$\epsilon(x) = a_0 + a_1 x + a_2 x^2 \quad (43)$$

The second order polynomial is one degree less than the number of strain gauge locations along the beam, which is currently being increased by two for improved accuracy. The approximation M(x) can then be used to find the curvature, $\rho(x)$ along the beam, $$\frac{1}{\rho(x)} = \frac{M(x)}{EI} \quad (44)$$

Figure 11:
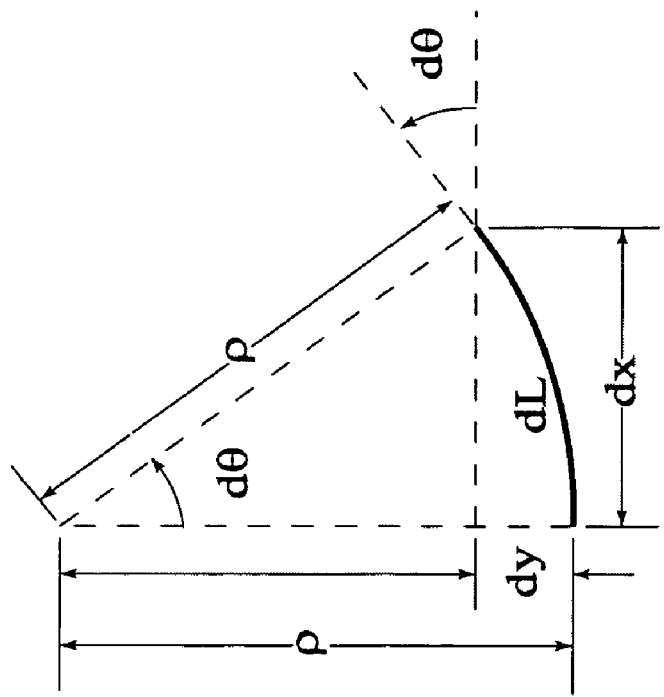
FIG. 11 is a diagram showing relative angle data of a robot system in accordance with an embodiment of the present invention.

Once $\rho(x)$ is known it is a matter of numerically integrating along the length of the beam, as in FIG. 11, using the relationships, $$d\theta = \frac{dL}{\rho} \quad (45)$$

$$dx = \rho \sin(\theta)$$

$$dy = \rho(1 - \cos(\theta))$$

These equations are then integrated to determine the relative posture of the beam endpoints. Pathwise integration of equation (45) then provides position and orientation of endpoint B relative to endpoint A. Using this data in equation (41), we can then predict, $F_x$. Sensor function algorithms can be integrated into the system model using concepts similar to those as discussed above for creating the system model.

We now discuss one particular dynamic control approach for translating a planned system motion into planned motions of the individual wheeled robot modules. In one exemplary embodiment, nonlinear backstepping algorithms may be used to control the dynamics of the robot system while performing point stabilization, path following, and trajectory tracking. Backstepping provides a means of extending the dynamics of the control inputs in order to compensate for variation in the actual system posture from the ideal trajectories specified by the motion planning algorithms.

For control purposes, it may be preferable to express the robot system in terms of the velocities $v_i$ and $\omega_i$ as in Eq. (19). Differentiating Eq. (19) with respect with time, substituting this result into Eq. (12), and then multiplying by $S^T(Q)$, the constraint matrix $A^T(Q)\lambda$ can be eliminated. The complete dynamic equation of the CFMMR is then given by $$S^T M S \dot{v} + S^T M \dot{S} v + S^T F + S^T \tau_d + S^T F_K(Q) = S^T E \tau \quad (46)$$

where Lagrange multipliers are no longer used and applied wheel torque is now an input to the system as a function of system states.

Either reference trajectories or relatively basic model based backstepping can be used, where the latter is generally less complex. For example, velocity trajectories may be specified for each axle to provide drift free curvature based steering algorithms for a two-axle scout configuration that minimize traction forces and account for frame foreshortening due to steering angles.

Figure 12:
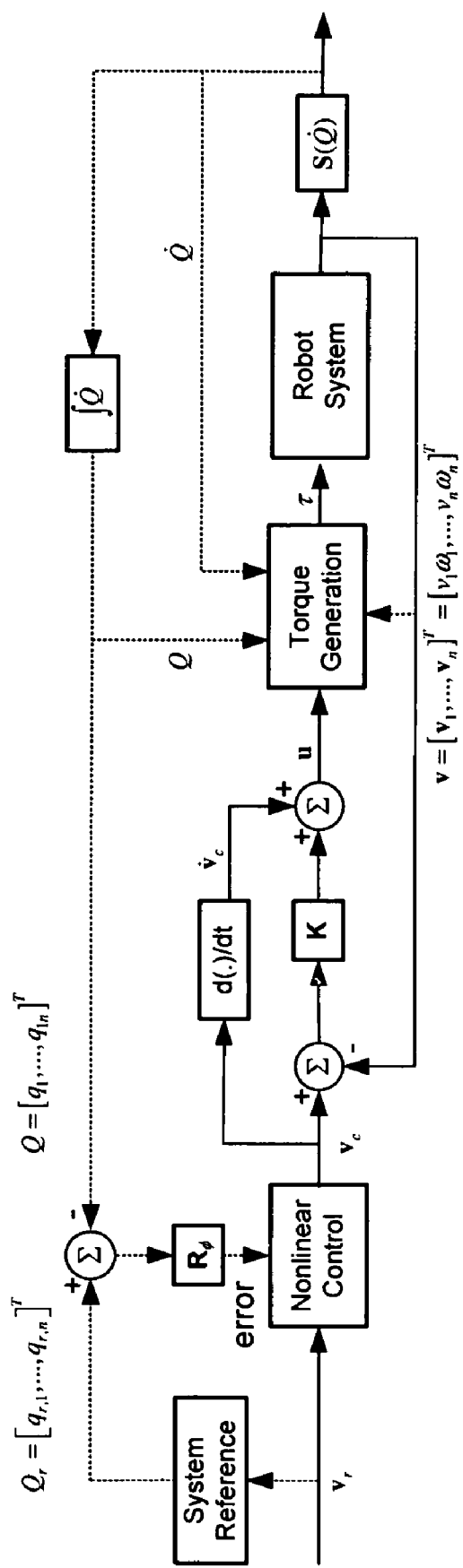
FIG. 12 is a diagram showing a backstepping control structure of a robot system in accordance with an embodiment of the present invention in accordance with an embodiment of the present invention.

We will now derive a multi-module robot configuration model. The first step in this process is to specify the dynamic extension of the velocity input, $v \in R^{2n \times 1}$, such that we add 2n states to the system, $$\dot{Q} = S(Q)v \quad (47)$$

$$\dot{v} = u \quad (48)$$

where $u \in R^{2n \times 1}$ is used to steer the velocities. These equations allow the 2n steering commands $v(t)$ to be converted to 2n torques, $\tau(t) \in R^{2n \times 1}$, from Eq. (46) such that, $$\tau = (S^T E)^{-1} [S^T M S u + S^T M \dot{S} v + S^T F + S^T \tau_d + S^T F_K] \quad (49)$$

where it is assumed that we have complete knowledge of the dynamic model. The objective is to then derive a suitable $\tau(t)$ such that the robot system will exhibit the desired behavior by selecting a smooth steering velocity, $$v_c(t) = [v_{c,1}(t) \ldots v_{c,n}(t)]^T \quad (50)$$

where $v_{c,i}(t) = [v_i \ \omega_i]$ is the steering velocity for the $i^{th}$ axle module [10] and $v_c(t) \in R^{2n \times 1}$. For the specific two-module scout configuration, $v_c(t) = [v_{c,1}(t) \ v_{c,2}(t)]^T \in R^{4 \times 1}$. The Backstepping control structure for the robot system presented in FIG. 12, which illustrates where these steering velocities are located in the architecture. The next step is to reformulate the error state model for tracking where the error position vector for each axle is defined as, $$e_i = R_{\phi,i}(q_{r,i} - q_i) \quad (51)$$

where $q_{r,i}$ is the reference vector for the $i^{th}$ axle and thus $e_i \in R^{3 \times 1}$. These are then combined to form a system level error vector, $$e = [e_1 \ldots e_n]^T \in R^{3n \times 1} \quad (52)$$

The smooth time varying velocity control input for the $i^{th}$ axle is then given by $$v_{c,i} = \begin{bmatrix} v_{r,i} \cos e_{\phi,i} + k_{X,i} e_{X,i} \\ \omega_{r,i} + k_{Y,i} v_{r,i} e_{Y,i} + k_{\phi,i} v_{r,i} \sin e_{\phi,i} \end{bmatrix} \quad (53)$$

where $k_i = [k_{X,i} \ k_{Y,i} \ k_{\phi,i}]$ are positive constants for the $i^{th}$ axle. The system level velocity control input for Eq. (49) is then, $$v_c = [v_{c,1} \ldots v_{c,n}]^T \in R^{2n \times 1} \quad (54)$$

The nonlinear feedback acceleration control input is then, $$u = \dot{v}_c + K(v_c - v) \quad (55)$$

where $K = kI$ is a positive definite diagonal matrix. To show that this will drive the velocity error to zero, define the velocity error vector for each axle as, $$e_{c,i} = \begin{bmatrix} e_{v,i} \\ e_{\omega,i} \end{bmatrix} = v_i - v_{c,i} \quad (56)$$

$$= \begin{bmatrix} v_i - v_{r,i} \cos e_{\phi,i} - k_{X,i} e_i \\ \omega_i - \omega_{r,i} - k_{Y,i} v_{r,i} e_{Y,i} - k_{\phi,i} v_{r,i} \sin e_{\phi,i} \end{bmatrix}$$

such that the system level velocity error becomes, $$e_c = [e_{c,1} \ldots e_{c,n}]^T \in R^{3n \times 1} \quad (57)$$

To show that the error states are driven to zero, consider the following n Lyapunov candidates, $V_i$, for the $i^{th}$ axle where $V_i \geq 0$, and $V_i = 0$ only if $e_i = 0$ and $e_{c,1} = 0$, where $i = 1 \ldots n$, and, $$V_i = k_{X,i}(e_{X,i}^2 + e_{Y,i}^2) + \frac{2 k_{X,i}}{k_{Y,i}}(1 - \cos e_{\phi,i}) + \frac{1}{2k}\left(e_{v,i}^2 + \frac{k_{X,i}}{k_{Y,i} k_{\phi,i} v_{r,i}} e_{\omega,i}^2\right) \quad (58)$$

The derivative of the $V_i$ with respect to time then become negative semi-definite and the origin of the entire error $e = [e \ e_c]^T$ is shown to be uniformly asymptotically stable. Thus, the velocity vector of the entire system satisfies $v \to v_c$ as $t \to \infty$.

The backstepping controller model can be applied, for example, by a curvature based motion planning algorithm which guides the midpoint, O, of the robot to follow a desired path. The velocity trajectories can be specified, for example, such that the distance between points $O_1$ and $O_2$ remains substantially constant with the foreshortened length $L_f$ of the frame given the current axle headings. Experimental results have shown this approach works well, although in practice improved results may be obtained by tuning the gains to improve tracking. The off tracking results observed in experiments are expected, since the trajectory tracker specified in Eg. (52) is not drift-free, and thus model uncertainty can result in error. Note, however, the motion planning algorithm used to specify the velocities of the axles results in generally drift-free guidance of point O, causing convergence to the desired path.

Figure 13:
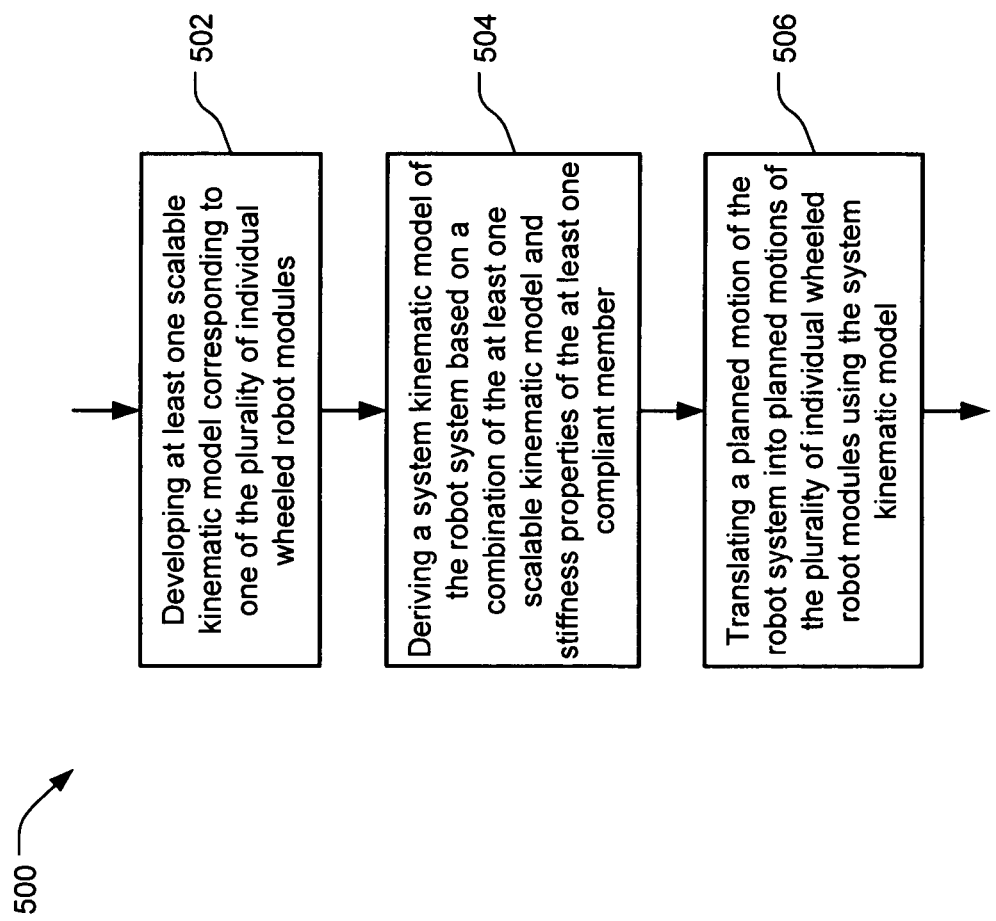
FIG. 13 is a flow chart of a method of controlling motion of a robot system in accordance with an embodiment of the present invention.

In accordance with another embodiment of the present invention, FIG. 13 illustrates a method of controlling motion of a robot system wherein the robot system includes a plurality of individual wheeled robot modules interconnected by at least one compliant member. For example, a robot system may be configured as described above. The method 500 may include developing 502 at least one scalable kinematic model corresponding to one of the plurality of individual wheeled robot modules. The method may further include deriving 504 a system kinematic model of the robot system based on a combination of at least one scalable kinematic model and stiffness properties of the at least one compliant member. For example, techniques for developing the system kinematic model are described above. The method may also include translating 506 a planned motion of the robot system into planned motions of the plurality of individual wheeled robot modules using the system kinematic model. For example, planning may be performed using backstepping control algorithms as described above.

Figure 14:
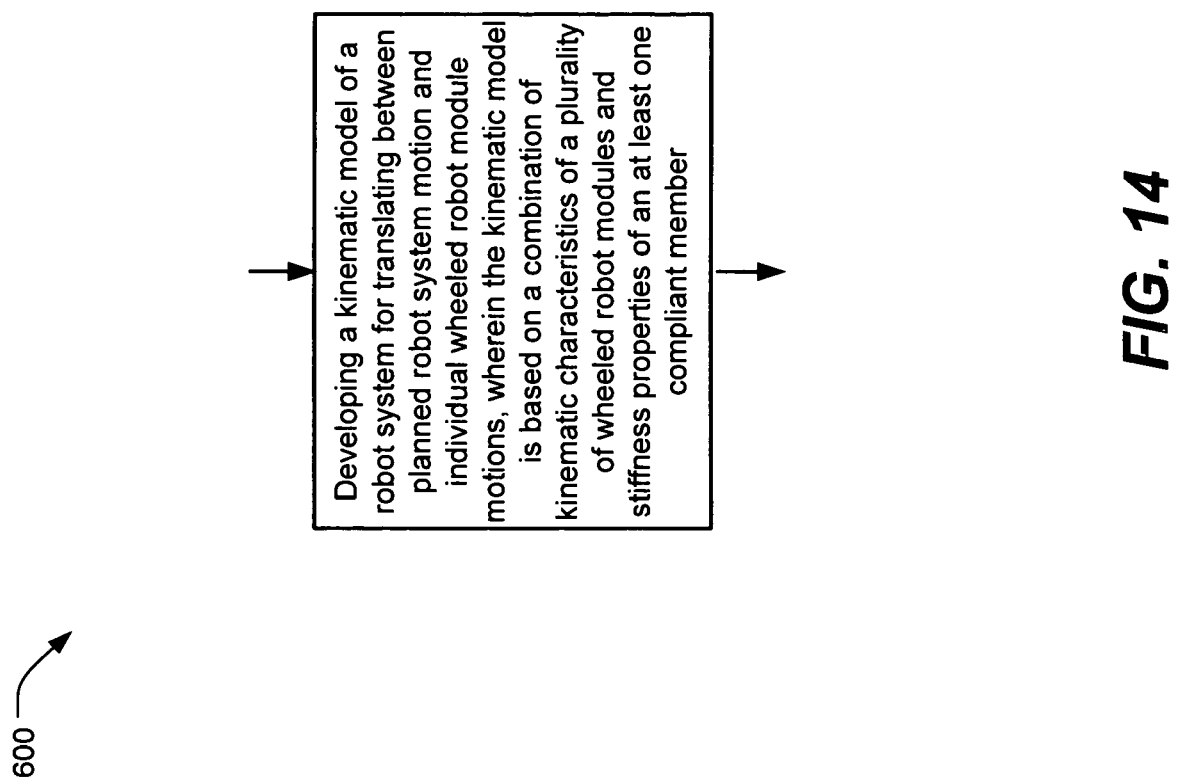
FIG. 14 is a flow chart of a method of controlling motion of a robot system in accordance with an embodiment of the present invention.

In accordance with another embodiment of the present invention, a method of controlling motion of a robot system is illustrated in FIG. 14. The robot system may include a plurality of individual wheeled robot modules interconnected by at least one compliant member. The method 600 includes developing a kinematic model of the robot system for translating between planned robot system motion and individual wheeled robot module motion commands. The kinematic model is based on a combination of kinematic characteristics of the plurality of wheeled robot modules and stiffness properties of the at least one compliant member. In accordance with another embodiment of the present invention, the method may also include accounting for force-deflection coupling between the plurality of individual wheeled robot modules through the at least one compliant member. In accordance with yet another embodiment of the present invention, the method may also include translating a planned motion of the robot system into planned motions of the plurality of individual wheeled robot modules using the system kinematic model wherein loading on at least one compliant member is taken into account. Finally, in accordance with another embodiment of the present invention, the method may also include accounting for post-buckling deflection of the at least one compliant member.

As has been shown, modular kinematic models, dynamic models, and a scalable model based backstepping controller can provide control of a robot system constructed from a plurality of individual wheeled robot modules with a compliant frame consisting of compliant members interconnecting the individual wheeled robot modules. Simulation and testing of robot systems using the above techniques has demonstrated excellent performance. The simple modular design of the robot system can provide suspension and steering capability with less complexity than traditional rigid frame robot systems. Challenges associated with the reconfigurability of the robot system can be addressed by deriving the robot system kinematic model from the kinematic model(s) of the individual wheeled robot modules and the stiffness properties of the compliant frame. The robot system, control methods, and control module as described above may therefore prove advantageous in a number of applications, including space exploration.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method of controlling motion of a robot system wherein the robot system includes a plurality of individual wheeled robot modules interconnected by at least one partially compliant member, the method comprising:
    developing at least one scalable kinematic model corresponding to one of the plurality of individual wheeled robot modules;
    deriving a system kinematic model of the robot system based on a combination of the at least one scalable kinematic model and stiffness properties of the at least one partially compliant member; and
    steering the robot system by dynamically controlling torque applied to wheels on the plurality of wheeled robots to bend the at least one partially compliant member in a desired direction based on dynamic changes in the system kinematic model that occur as the at least one partially compliant member flexes wherein the plurality of individual wheeled robot modules are under control of an electronics system using the system kinematic model.

2. The method of claim 1 wherein developing at least one scalable kinematic model comprises developing a single scalable kinematic model corresponding to a plurality of substantially identical individual wheeled robot modules.

3. The method of claim 1 wherein developing at least one scalable kinematic model comprises developing N scalable kinematic models corresponding to N different individual wheeled robot module configurations.

4. The method of claim 1 wherein deriving a system kinematic model of the robot system further comprises forming a frame stiffness matrix wherein the frame stiffness matrix represents coupling between the plurality of individual wheeled robot modules through the at least one partially compliant member.

5. The method of claim 1 wherein steering robot system further comprises maximizing wheel traction forces.

6. The method of claim 1 wherein steering the robot system further comprises sensing a relative posture of the plurality of individual wheeled robot modules.

7. The method of claim 1 wherein steering the robot system further comprises maintaining a predefined mechanical constraint on the at least one partially compliant member.

8. The method of claim 7 wherein the predefined mechanical constraint is to limit force applied to the at least one partially compliant member to a bending force.

9. The system of claim 1, further comprising moving the individual wheeled robot modules in accordance with the planned motions to move the robotic system.

10. A method of controlling motion of a robot system wherein the robot system includes a plurality of individual wheeled robot modules interconnected by at least one partially compliant member, the method comprising developing a kinematic model of the robot system for steering the robot system by dynamically controlling torque applied to wheels on the plurality of individual wheeled robot modules to flex the at least one partially compliant member in a desired direction based on dynamic changes in the system kinematic model, the method being implemented within an electronics system.

11. The method of claim 10 further comprising accounting for force-deflection coupling between the plurality of individual wheeled robot modules through the at least one partially compliant member.

12. The method of claim 10 further comprising accounting for post-buckling force-deflection of the compliant member.

13. The method of claim 10 further comprising adjusting planned motions of the plurality of individual wheeled robot modules based on sensed deflection in the compliant member.

14. The system of claim 10, further comprising executing the individual wheeled robot module motion commands to move the robotic system.

* * * * *